United States Patent [19]

Ito et al.

[11] Patent Number: 5,224,036
[45] Date of Patent: Jun. 29, 1993

[54] PATTERN RECOGNITION APPARATUS

[75] Inventors: Wataru Ito; Shoji Hara, both of Kanagawa, Japan

[73] Assignee: Fuji Photo Film Co., Ltd., Kanagawa, Japan

[21] Appl. No.: 542,338

[22] Filed: Jun. 22, 1990

[30] Foreign Application Priority Data

Jun. 26, 1989 [JP] Japan ............................. 1-162912
Oct. 19, 1989 [JP] Japan ............................. 1-272223

[51] Int. Cl.$^5$ ....................... G06F 15/00; G06K 9/00
[52] U.S. Cl. .................................. 364/413.13; 382/6
[58] Field of Search ................. 364/413.13, 413.16, 364/413.17, 413.01; 382/6; 356/376; 250/341

[56] References Cited

U.S. PATENT DOCUMENTS

| | | | |
|---|---|---|---|
| 4,258,264 | 3/1981 | Kotera et al. | 250/484 |
| 4,276,473 | 6/1981 | Kato et al. | 250/327.1 |
| 4,315,318 | 2/1982 | Kato et al. | 364/515 |
| 4,387,428 | 6/1983 | Ishida et al. | 364/414 |
| 4,769,850 | 9/1988 | Itoh et al. | 382/25 |
| 4,839,807 | 6/1989 | Doi et al. | 364/413.13 |

FOREIGN PATENT DOCUMENTS 56-11395  2/1981  Japan .
61-5193   2/1986  Japan .
1125675   5/1989  Japan .

OTHER PUBLICATIONS

Mikio Hino, Tohkei Raiburari Supekutoru Kaiseki (Statistics Library Spectrum Analysis), published by Asakura Shoten.
Systems, Computers, Controls, vol. 12, No. 4, Jul. 1981, Silver Spring, US, pp. 10-18, K. Honma et al., "An Image Processing Procedure for Extraction of Unusual Contour Shape in Radioisotope Images of the Human Liver".
Proceedings International Conference on Acoustics, Speech and Signal Processing, vol. 1, Apr. 1987, Dallas, US, pp. 225-228, H. J. Dohse et al., "Object Classification and Registration by Radon Transform Based Invariants".
IEEE Conference on Computer Vision and Pattern Recognition, 1988, Ann Arbor, US, pp. 641-646, N. Kiryati, "Calculating Geometric Properties of Objects Represented by Fourier Coefficients of Boundary Functions".
IEEE Transactions on Pattern Analysis and Machine, vol. 6, No. 1, Jan. 1984, New York, US, pp. 46-57, J. Altmann & H. J. P. Reitbock, "A Fast Correlation Method for Scale- and Translation-Invariant Pattern Recognition".
IEEE Acoustics, Speech, and Signal Processing Magazine, Jul., 1984, New York, US, pp. 3-11, M. R. Schroeder, "Linear Prediction, Entropy and Signal Analysis".

Primary Examiner—Roy N. Envall, Jr.
Assistant Examiner—X. Chung
Attorney, Agent, or Firm—Sughrue, Mion, Zinn, Macpeak & Seas

[57] ABSTRACT

An apparatus for determining the probability that the shadow of a tumor designated on a radiation image of an object is the shadow of a malignant tumor on the basis of an image signal representing the radiation image includes a spectrum calculating means, a characteristic value calculating means, and a judging means. The spectrum calculating means obtains the spectrum distribution of the image signal D(r,θ) whose coordinates are expressed in polar form with the origin taken as the approximate center of the shadow. From the spectrum distribution the characteristic value calculating means obtains a characteristic value, which the judging means uses to determine the probability that the shadow of a tumor is the shadow of a malignant tumor.

6 Claims, 7 Drawing Sheets

PATTERN RECOGNITION APPARATUS

BACKGROUND OF THE INVENTION

1. Field of the Invention

This invention relates to a pattern recognition apparatus for determining the probability that the shadow of a tumor on a radiation image is the shadow of a malignant tumor, based on an image signal representing the radiation image.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen for the type of image processing to be carried out, the X-ray image is read out from the X-ray film and converted into an electric signal, and the electric signal (image signal) is processed and then used for reproducing the X-ray image as a visible image on a copy photograph or the like. In this manner, a visible image having good image quality with high contrast, high sharpness, high graininess or the like can be reproduced.

Also, when certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor. As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as a human body in order to store a radiation image of the object thereon, and is then scanned with stimulating rays, such as a laser beam, which cause it to emit light in proportion to the amount of energy stored thereon during its exposure to the radiation. The light emitted by the stimulable phosphor sheet upon stimulation thereof is photoelectrically detected and converted into an electric image signal, and the image signal is used to reproduce the radiation image of the object as a visible image on a recording material such as photographic film, on a display device such as a cathode ray tube (CRT), or the like.

Radiation image recording and reproducing systems which use stimulable phosphor sheets are advantageous over conventional radiography using silver halide photographic materials in that images can be recorded even when the energy intensity of the radiation to which the stimulable phosphor sheet is exposed varies over a wide range. More specifically, since the amount of light emitted by the stimulable phosphor varies over a wide range and is proportional to the amount of energy stored during its exposure to the radiation, it is possible to obtain a visible image having a desirable density regardless of the energy intensity of the radiation to which the stimulable phosphor sheet was exposed. In order to obtain a desirable image density, an appropriate read-out gain is set when the emitted light is being detected with a photoelectric read-out means and converted into an electric signal to be used in the reproduction of a visible image on a recording material, such as photographic film, or on a display device such as a CRT.

In the above-mentioned systems using the X-ray film or stimulable phosphor sheets, specifically in system constituted for the purpose of facilitating medical treatments or diagnoses, not only have visible images been obtained which have good image quality and are suitable for use in making medical observations (diagnoses), but also, as disclosed in U.S. Pat. No. 4,769,850, for example, pattern recognition of images has been carried out recently.

In this specification, the term "pattern recognition of images" or simply "pattern recognition" shall be understood to mean an operation for extracting a predetermined pattern from very complicated images. For example, the pattern recognition may mean the operation with which the shadow of a tumor is extracted from a lung X-ray image including various linear and circular patterns.

In a complicated image, such as an X-ray image of a lung, mamma, or the like, predetermined patterns, such as shadows of tumors are extracted, and thereafter a visible image wherein the extracted patterns are pointed out is reproduced in order to facilitate observation of the tumor, or the diagnosis thereof by a medical doctor.

In said U.S. Patent No. 4,769,850, a pattern recognition apparatus is disclosed, wherein the image signal corresponding to an X-ray image of a human body is passed through a specific spatial filter so as to extract circular and linear patterns, which are respectively regarded as shadows of tumors and shadows of blood vessels, and then these patterns are displayed.

Radiation images of the human body are very complicated even for a normal (healthy) human bodies. Further, the shadows of tumors which may appear in an X-ray image of a lung, mamma, or the like may have a variety of sizes, and also the shape and density of the shadows may vary according to their position on the image. Therefore, in order to extract a variety of tumor shadows, a circular pattern extracting filter for extracting tumor shadows, for example, the one described in said U.S. Pat. No. 4,769,850, must have a considerably wide tolerance.

However, only the shadows of malignant tumors should be extracted, but if a tumor extracting filter having a wide tolerance is used, both the shadows of malignant tumors and the shadows of benign tumors are extracted.

OBJECT OF THE INVENTION

In view of the above described circumstances, the object of the present invention is to provide an apparatus for determining the probability that the shadow of a tumor, for example one extracted when the image signal corresponding to a radiation image is passed through a spatial filter, is the shadow of a malignant tumor.

Another object of the present invention is to provide an apparatus which condenses characteristic data representing whether the subject shadow of a tumor is the shadow of a benign tumor or the shadow of a malignant tumor into a single characteristic value; hence, said probability can be easily determined on the basis of the characteristic value.

SUMMARY OF THE INVENTION

The pattern recognition apparatus in accordance with the present invention comprises i) a spectrum calculating means which obtains the spectrum distribution of the image signal $D(r,\theta)$ whose coordinates are expressed in polar form with the origin being assigned to the approximate center of said shadow and r and $\theta$ respectively representing the length of the radius vector and the angle the radius vector makes with a fixed half-line, said spectrum distribution being obtained with respect to r and $\theta$, ii) a characteristic value calculating means for obtaining a characteristic value representing said spectrum distribution, and iii) a judging means for determining the probability that said shadow of a tumor is the shadow of a malignant tumor on the basis of said characteristic value.

"Obtaining a spectrum distribution" shall be understood herein to mean an operation wherein the spectrum distribution is obtained with respect to r and $\theta$, and wherein r and $\theta$ are the values of the coordinates of the image signal in polar form and r and $\theta$ are the projections of the point $D(r,\theta)$ onto orthogonal r and $\theta$ axes in an r$\theta$-plane. The operation is not restricted to a specific calculation method. Examples of such operations are: a one-dimensional Fourier transformation calculated with regard to r and $\theta$, the maximum entropy method (abbreviated as MEM) (see "TOHKEI RAIBURARI SUPEKUTORU KAISEKI" [translated as Statistics Library Spectrum Analysis]Mikio Hino, published by Asakura Shoten) calculated with respect to r and $\theta$, a two-dimensional Fourier transformation for both r and $\theta$, or the like.

The "calculated value" means a value whose amount shows which of two groups the shadows of tumors fall into, namely a group of shadows of benign tumors or a group of shadows of malignant tumors. As a concrete example, the characteristic value is found from the coordinates of the center of gravity of the spectrum distribution (first moment), from the second moments of the spectrum distribution, or the like.

In the case of the benign tumors, the typical shape of the shadow is almost round, and the density of the shadow is uniform, that is the value of the image signal of the shadow varies smoothly. On the other hand, in the case of the malignant tumors, the density of the shadow is not uniform, that is the value of the image signal of the shadow varies quickly, and the shape of the shadow is irregular.

The present invention is based on the findings described above.

In the spectrum calculating means of the pattern recognition apparatus of the invention, the coordinates of the image signal of the shadow of a tumor are expressed in polar form, with the origin taken at the approximate center of the shadow and the points $P(r,\theta)$ being able to be projected onto orthogonal r and $\theta$ axes, respectively. The spectrum distribution of an image signal $D(r,\theta)$ is then obtained. Therefore, the spectrum distribution contains, to a large extent, information about the degree of uniformity of the density of the shadow or the degree of regularity of the shape thereof.

Also, in the pattern recognition apparatus of the invention, the characteristic value is obtained by means of the characteristic value calculating means, and the probability that the subject shadow of a tumor is the shadow of a malignant tumor is determined by the judging means from the characteristic value. Therefore, the characteristics of the image signal showing whether the subject shadow of a tumor is the shadow of a benign tumor or the shadow of a malignant tumor are condensed into a single characteristic value and thereby the probability can easily be determined.

DESCRIPTION OF THE PREFERRED EMBODIMENTS

The present invention will hereinbelow be described with reference to the accompanying drawings. The following embodiment is an example of the apparatus according to the present invention which detects the shadow of a spherically-shaped tumor in a mamma. A visible image of this tumor can be reproduced on the basis of an image signal S1 (to be describe below). In such a visible image, the shadow of the tumor appears white; that is, the shadow has a lower density than the surrounding area.

Figure 1:
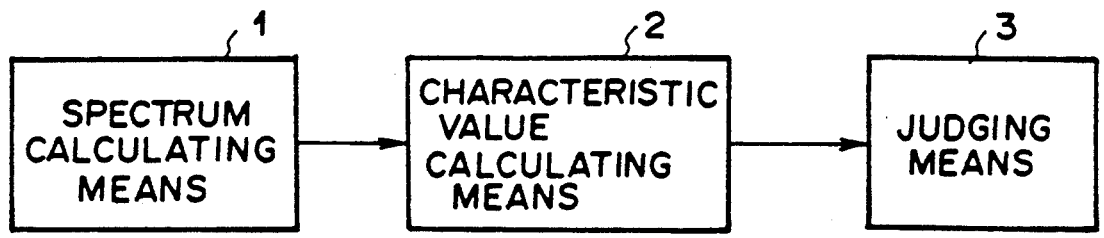
FIG. 1 is a block diagram of the invention.

Reference is made to FIG. 1, which is a block diagram of the invention. A spectrum calculating means 1 first transforms the coordinates of an image signal representing a radiation image of an object from rectangular into polar form, with the origin being taken approximately at the center of the shadow of a tumor designated on the radiation image and r and $\theta$ respectively representing the length of the radius vector (directed distance from the origin) and the angle the radius vector makes with a fixed half-line. Then, the spectrum calculating means 1 obtains the spectrum distribution of the image signal $D(r,\theta)$.

After the spectrum distribution has been obtained, data representing the spectrum distribution is input into a characteristic value calculating means 2. In the characteristic value calculating means 2, a characteristic value which represents the spectrum distribution is calculated from the spectrum data.

After the characteristic value is calculated, it is input into a judging means 3. In the purging means 3, the probability that the subject shadow is the shadow of a malignant tumor is determined on the basis of the characteristic value.

Figure 2:
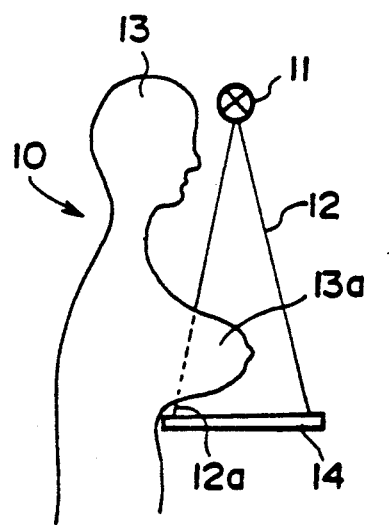
FIG. 2 is a schematic illustration showing an example of an X-ray image recording apparatus.

Referring to FIG. 2 showing an example of an X-ray apparatus, a mamma 13a of a human body 13 is exposed to X-rays 12 emitted from an X-ray source 11. Then, a stimulable phosphor sheet 4 is exposed to X-rays 12 which have passed through the mamma 13a. Hence, an X-ray image of the mamma 13a is stored on the stimulable phosphor sheet 14.

Figure 3:
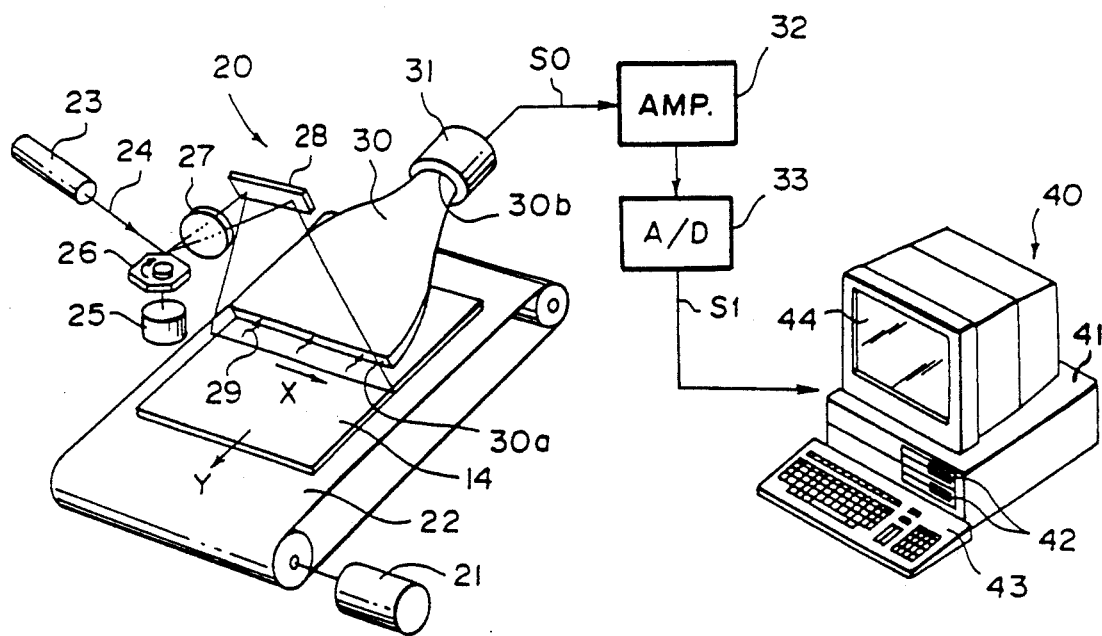
FIG. 3 is a perspective view showing an example of a combination of an X-ray image read-out apparatus and a computer system, which computer system is an embodiment of pattern recognition apparatus in accordance with the invention.

FIG. 3 is a perspective view showing an example of a combination of an X-ray image read-out apparatus and a computer system. The computer system is an embodiment of a pattern recognition apparatus in accordance with the invention.

The stimulable phosphor sheet 14 on which the X-ray image of a mamma has been stored is placed at a predetermined position in the read-out apparatus 20. The stimulable phosphor sheet 14 is conveyed in a sub-scanning direction indicated by the arrow Y by a sheet conveyance means 22, which is constituted of an endless belt or the like and which is operated by a motor 21. A laser beam 24, which is produced by a laser beam source 23, is reflected and deflected by a rotating polygon mirror 26, which is quickly rotated by a motor 25 in the direction indicated by the arrow, and passes through a converging lens 27 constituted of an of lens or the like. The direction of the optical path of the laser beam 24 is then changed by a mirror 28, and the laser beam 24 impinges upon the stimulable phosphor sheet 14 and scans it in a main scanning direction indicated by the arrow X, which direction is approximately normal to the subscanning direction indicated by the arrow Y. When the stimulable phosphor sheet 14 is exposed to the laser beam 24, the exposed portion of the stimulable phosphor sheet 14 emits light 29 in an amount proportional to the amount of energy stored thereon during its exposure to the X-rays. The emitted light 29 is guided by a light guide member 30, and photoelectrically detected by a photomultiplier 31. The light guide member 30 is made from a light guiding material such as an acrylic plate, and has a linear light input face 30a, which is positioned so that it extends along the main scanning line on the stimulable phosphor sheet 14, and a ring-shaped light output face 30b, which is positioned so that it is in close contact with a light receiving face of the photomultiplier 31. The emitted light 29, which has entered the light guide member 30 at its light input face 30a, is guided through repeated total reflection inside of the light guide member 30, emanates from the light output face 30b, and is received by the photomultiplier 31. In this manner, the amount of the emitted light 29, which represents the X-ray image, is converted into an electric signal by the photomultiplier 31.

An analog output signal S0 is generated by the photomultiplier 31 and is logarithmically amplified by a logarithmic amplifier 32. It is then digitized by an A/D converter 33 into an image signal S1.

The image signal S1, which has been obtained in the manner described above, is fed into the computer system 40. The computer system 40, which is an embodiment of a pattern recognition apparatus in accordance with the invention, constituted of a main body 41 containing the CPU and internal memories, drive units 42 for the floppy disks, a key board 43 from which necessary instructions are input to the computer system 40, and a CRT display unit 44 for displaying necessary information.

Figure 4:
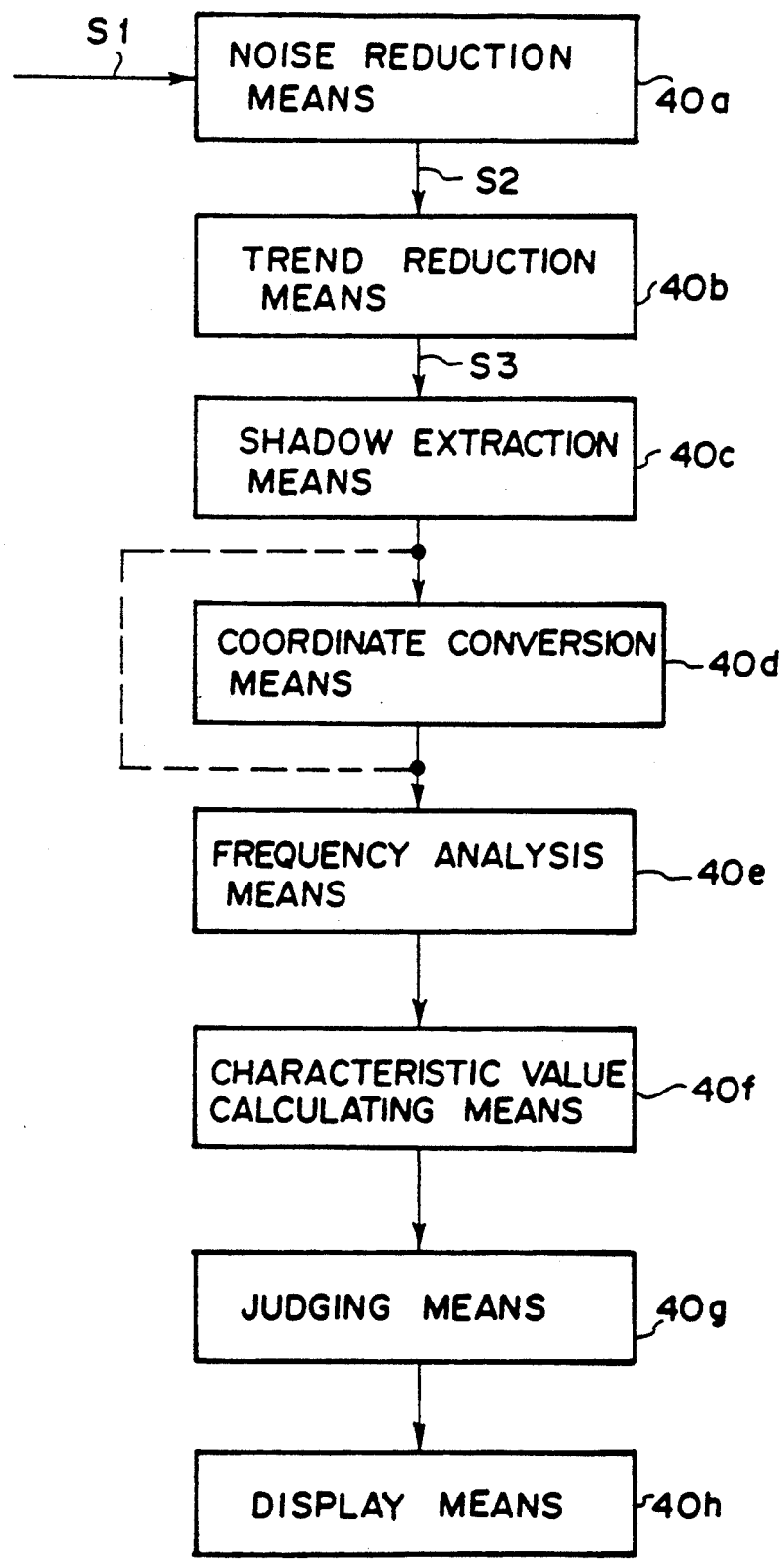
FIG. 4 is a block diagram showing the processing executed on an image signal in the computer system shown in FIG. 3.

Reference is made to FIG. 4 showing the processing procedure executed on the image signals S1 in the computer system 40 shown in FIG. 3. In this embodiment, each means corresponding to each block 40a-40h is realized in software in the computer system 40. Therefore, each means should be regarded as the combination of software and the associated hardware necessary for completing each operation corresponding to each block 40a-40h.

The image signal S1 is first fed into a noise reduction means 40a in the computer system 40, in which the high frequency noise, which carries no information about the X-ray image, is reduced. This noise reduction operation is performed, for example, by passing the X-ray image signal through a filter wherein the image signal components $S1_i (i=0,1,2, \ldots , n)$ corresponding to an predetermined image element $P_0$ and the image elements surrounding the image element $P_0$ are averaged, namely an operation defined by the formula $$S2_0 = \frac{1}{n+1} \sum_{i=1}^{n} S1_i$$

is carried out, and then the image signal component $S1_0$ corresponding to the predetermined image element $P_0$ is replaced with the averaged image signal element $S2_0$.

After the high frequency noise is reduced, the resulting image signal S2 is fed into a trend reduction means 40b, wherein the low frequency noise included in the image signal S2 is removed. Low frequency noise results when the shadow of a tumor is in a region of the X-ray image whose background density is changing slowly. When the density change is removed, the shadow of the tumor occurs in a flat density region. This low frequency noise reduction operation is performed, for example, by passing the X-ray image signal through a filter wherein the image signal imponents S2j $(j=0,1,2, \ldots , m)$ corresponding to a considerably wide region around a predetermined image element $P_0$ are averaged $$\left( \frac{1}{m+1} \sum_{j=0}^{m} S2_j \right),$$

the averaged image signal component is subtracted from the image signal component $S2_0$ of the predetermined image element $P_0$, then the subtracted signal element $S3_0$ is adopted as the signal component corresponding to the predetermined image element $P_0$. This operation can be expressed by the following formula:

$$S3_0 = S2_0 - \frac{1}{m+1} \cdot \sum_{j=0}^{m} S2_j \qquad (1)$$

After removing both high and low frequency noise in the manner described above, the resulting image signal S3 is then fed into a shadow extraction means 40c, wherein the shadows of tumors are extracted as follows.

Figure 5:
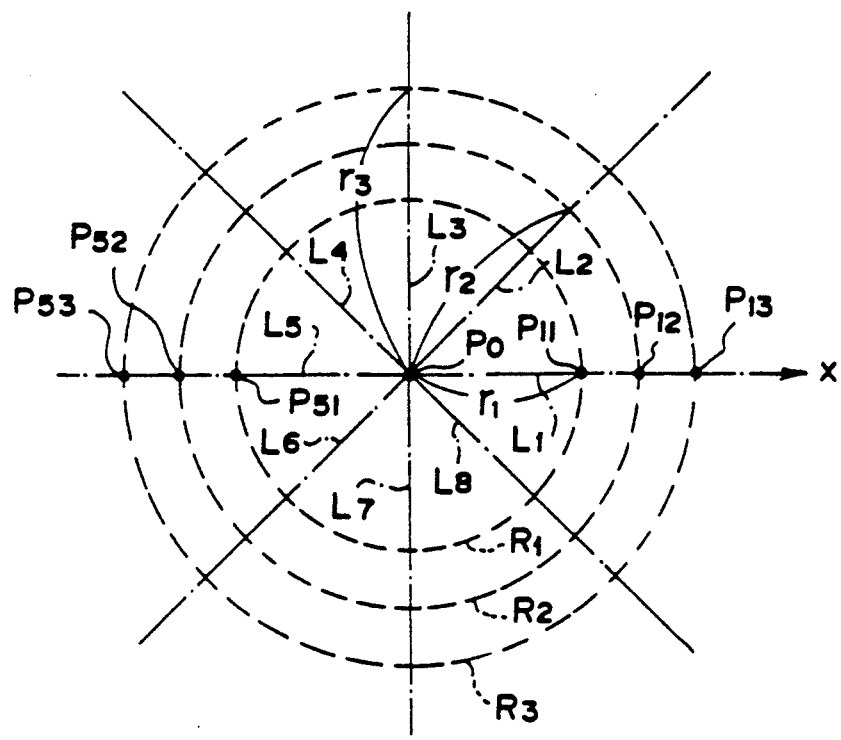
FIG. 5 shows imaginary lines drawn around a predetermined image element $P_0$ of an X-ray image in order to explain an example of a spacial filter for extracting shadows of tumors.

Reference is made to FIG. 5 which has imaginary lines indicated on the X-ray image around a predetermined image element $P_0$ in order to explain an example of a spatial filter for extracting the shadows of tumors. A judgment must be made as to whether the predetermined image element $P_0$ is or not in the shadow of a tumor. In the shadow extraction means 40c, the X-ray image signal is passed through the spatial filter explained below, and thereby the shadows of tumors on the X-ray image are extracted.

As shown in FIG. 5, a plurality of imaginary lines (8 lines in this example) are extended from a predetermined image element $P_0$ to the surrounding regions of the x-ray image, and further a plurality of imaginary circles $R_j$ (j=1,2,3) having the predetermined image element $P_0$ as their center and having respective radii $r_1$, $r_2$, and $r_3$ are superposed on the X-ray image. The image signal component corresponding to the predetermined image element $P_0$ is denoted by $f_0$ and each image signal component corresponding to each image element $P_{ij}$ which is situated at each point of intersection between each line $L_i$ and each circle $R_j$ is denoted by $f_{ij}$. The symbols $P_{11}$, $P_{12}$, $P_{13}$, $P_{51}$, $P_{53}$ are inscribed in FIG. 5.

Hereupon the differential values $\Delta_{ij}$ are calculated, which represent the differences in value between the image signal components $f_{ij}$ corresponding to image elements $P_{ij}$ and the image signal component $f_O$ corresponding to the predetermined image element $P_O$. The differential values $\Delta_{ij}$ are calculated by use of the following equation;

$$\Delta ij = f_{ij} - f_0 \qquad (2)$$

where i=1,2, ..., 8 and j=1,2,3.

Then, with respect to the each line $L_i$, the maximum value of the differential values is obtained. For example, for the line LI, the maximum value is selected from the following differential values:

$\Delta_{11} = f_{11} - f_0$, $\Delta_{12} = f_{12} - f_0$, $\Delta_{13} = f_{13} - f_0$ where the values of the image signal components correspond to the image elements $P_{11}$, $P_{12}$, $P_{13}$, and $P_0$. In this example, the differential value $\Delta_{11}$ has the maximum value in connection with the line $L_1$. Also, for the line $L_5$, a maximum value, for example, $\Delta_{52}$ is chosen from the following differential values:

$\Delta_{51} = f_{51} - f_0$ $\Delta_{52} = f_{52} - f_0$ $\Delta_{53} = f_{53} - f_0$ Because a maximum differential value is selected with respect to each line, this filtering operation is able to cop with a variety of shadows having various sizes.

Then, for each pair of lines extending in opposite directions, namely the lines $L_1$ and $L_5$, lines $L_2$ and $L_6$, lines $L_3$ and $L_7$, and lines $L_4$ and $L_8$ the maximum differential values are averaged. The averaged values are denoted respectively by $M_{15}$, $M_{26}$, $M_{37}$, and $M_{48}$. For example, for the pair of lines $L_1$ and $L_5$, the averaged value $M_{15}$ is calculated by use of the formula;

$$M_{15} = \frac{\Delta_{11} + \Delta_{53}}{2} \qquad (3)$$

In the manner described above, because the maximum differential values are calculated for each pair of lines extending in opposite directions, even in cases where the subject shadow of a tumor is in a region whose background density is changing too quickly for the trend reduction means 40b to eliminate the density changes, and consequently in cases where the image signal components around the subject shadow are not symmetrical, the subject shadow is extracted reliably.

After obtaining the averages $M_{15}$, $M_{26}$, $M_{37}$, and $M_{48}$, a characteristic value $C_1$ which is used for judging whether the predetermined image element $P_0$ is or is not in the shadow of a tumor, is obtained on the basis of the values of the averages $M_{15}$, $M_{26}$, $M_{37}$, and $M_{48}$ as follows.

Figure 6:
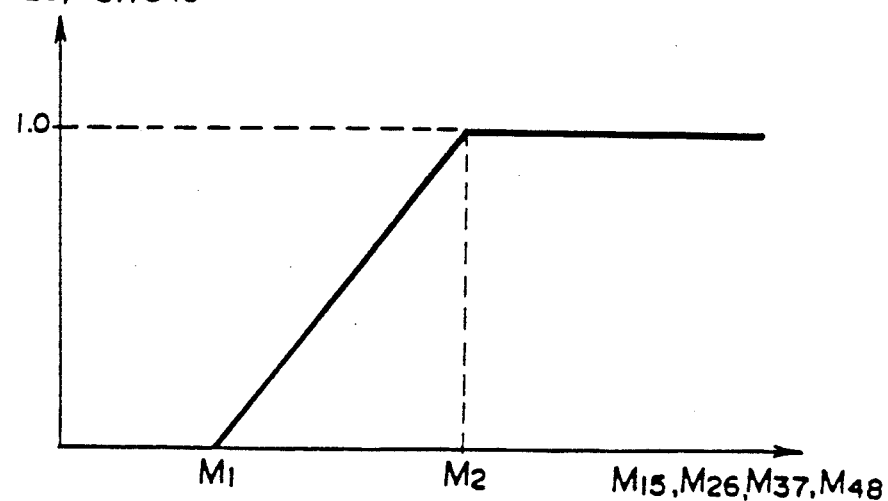
FIG. 6 is a graph for explained how a characteristic value which is calculated, said value being used for judging whether the predetermined image element $P_0$ is or is not an image element in the shadow of a tumor.

FIG. 6 is a graph for explaining how the characteristic value $C_1$ is calculated. The horizontal axis represents the averages $M_{15}$, $M_{26}$, $M_{37}$, and $M_{48}$ obtained in the above described manner. The vertical axis represents evaluating values $C_{15}$, $C_{26}$, $C_{37}$, and $C_{48}$, which are associated with the averages $M_{15}$, $M_{26}$, $M_{37}$, and $M_{48}$ respectively.

The evaluating values are found as follows. When the averages $M_{15}$, $M_{26}$, $M_{3;}$, and $M_{48}$ are less than a predetermined value $M_1$, the corresponding evaluating values $C_{15}$, $C_{26}$, $C_{37}$ and $C_{48}$ are assigned a value of zero; when the averages $M_{15}$, $M_{26}$, $M_{37}$ and $M_{48}$ are more than a predetermined value $M_2$, they are assigned a value of 1.0; and when the averages $M_{15}$, $M_{26}$, $M_{37}$, and $M_{48}$ have a value between $M_1$ and $M_2$, the corresponding evaluating values $C_{15}$, $C_{26}$, $C_{37}$ and $C_{48}$ are assigned a value between 0.0 and 1.0, depending on the value of the corresponding average. Thereafter, the sum of these evaluating values $C_{15}$, $C_{26}$, $C_{37}$, and $C_{48}$ $$C_1 = C_{15} + C_{26} + C_{37} + C_{48}. \ldots \qquad (4)$$

is obtained, and this sum is adopted as the characteristic value $C_1$. Therefore, the characteristic value $C_1$ will have a value between 0.0 and 4.0.

The characteristic value $C_1$ is compared with a predetermined threshold value $Th_1$ and a judgment is made as to whether the predetermined image element $P_0$ is or is not in the shadow of a tumor according to the results of the comparison, namely according to whether $C_1 \geq Th_1$ or $C_1 > Th_1$, respectively.

When the X-ray image signal is passed through the spacial filter described above, the shadows of tumors appearing in the X-ray image are extracted. When the shadow of a tumor is extracted, the image signal component which has the smallest value is found from among the image signal components corresponding to the inner domain of the shadow, and the location of this image signal component is chosen as the center of the shadow.

Figure 7A:
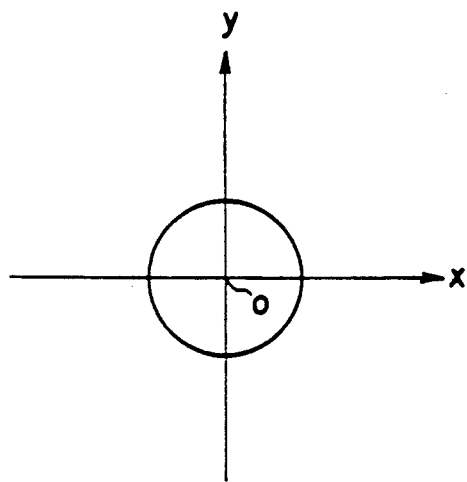
FIGS. 7A and 7B show typical configurations of the shadow of a benign tumor and the shadow of a malignant tumor, respectively, FIGS. 8A and 8B respectively show the shadows of the tumors shown in FIGS. 7A and 7B, with the coordinates of the image signal expressed in polar form and then graphed in a rectangular coordinate system in which the r-axis and the $\theta$-axis are orthogonal to each other, FIGS. 9A and 9B respectively show points plotted on a U-V space which designate second moments of the benign tumor (see FIGS. 7A and 8A) and the malignant tumor (see FIGS. 7B and 8B)
Figure 7B:
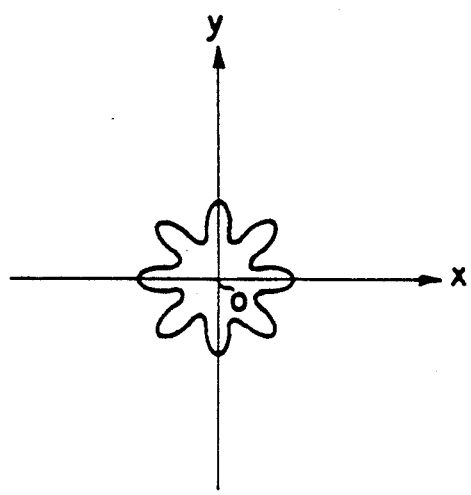

FIGS. 7A and 7B show typical configuration for the shadow of a benign tumor and the shadow of a malignant tumor, respectively. However, at this stage the shadow of the tumor has simply been extracted. A judgment has not yet been made as to whether the shadow is the shadow of a benign tumor or the shadow of a malignant tumor. In FIGS. 7A and 7B, the origin 0 which is at the point of intersection of the x-axis and y-axis, is the center of a shadow obtained according to the above-described method.

As described above, the shadow of a benign tumor has a nearly round shape with the origin 0 as the center of the circle and the value of the image signal corresponding to the inner domain of the shadow varying smoothly. On the other hand, the shadow of a malignant tumor has an irregular shape as shown in FIG. 7B, and the value of the image signal in the shadow varies greatly.

After the shadows of the tumors have been extracted and the centers of the shadows have been obtained, the image signal S3 is fed into a coordinate conversion means 40d in company with the information representing the locations of the extracted shadows. In the coordinate conversion means 40d, the coordinates of the image elements corresponding to the components of the image signal S3 at least corresponding to the region in and around the extracted shadows are converted from rectangular into polar form.

Figure 8A:
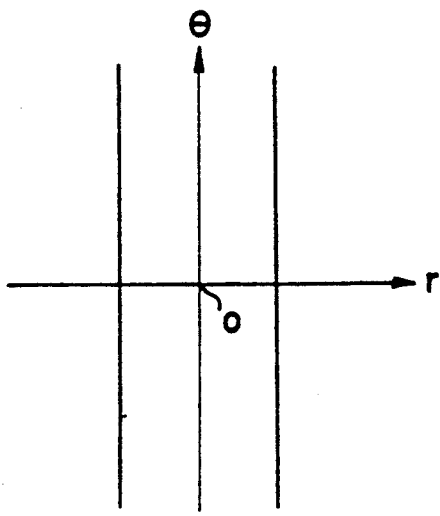
Figure 8B:
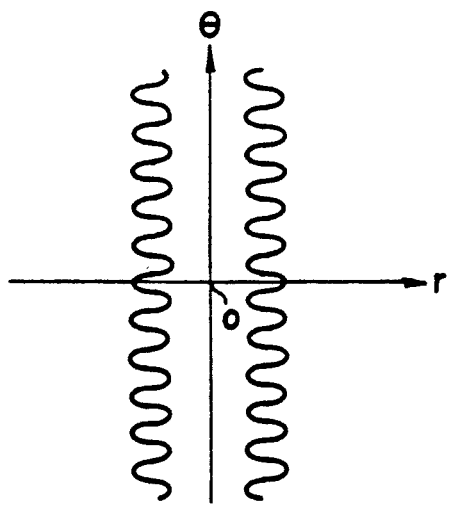

FIGS. 7A and 7B show the shadows of tumors graphed in a rectangular coordinate system. FIGS. 8A and 8B show the polar coordinates of the shadow of FIGS. 7A and 7B (the coordinates of the ordered pairs graphed in FIGS. 7A and 7B which have been transformed into polar form) graphed in a rectangular coordinate system.

Because for the shadow of a benign tumor the value of r hardly varies with respect to $\theta$, when the polar coordinates of the shadow of a benign tumor are graphed in a rectangular coordinate system, the graph will look like a pair of almost straight vertical lines, as shown in FIG. 8A. On the other hand, for the shadow of a malignant tumor, r varies greatly with respect to $\theta$, as shown in FIG. 8B.

The image signal S3 in correspondence with the region in and around the extracted shadows, whose coordinates are expressed in polar form, is then fed into a frequency analysis means 40e. In this embodiment, the two-dimensional Fourier transformation with respect to r and $\theta$ is executed on the image signal S3 so as to obtain the spectrum distribution F(u,v) of each extracted shadow. Therefore, for this embodiment, the combination of the coordinate conversion means 40d and the frequency analysis means 40e is regarded as an example of the spectrum calculating means in the pattern recognition apparatus according to the invention.

After the spectrum distribution F(u,v) of each shadow is obtained in the manner described above, it is fed into a characteristic calculating means 40f, which makes use of the following equations;

$$U = \int_0^\infty u^2 \left( \int_0^\infty F(u,v)dv \right) du / \int_0^\infty \int_0^\infty F(u,v)dudv \quad (5)$$

$$V = \int_0^\infty v^2 \left( \int_0^\infty F(u,v)du \right) dv / \int_0^\infty \int_0^\infty F(u,v)dudv \quad (6)$$

The second moments U and V of the spectrum distribution F(u,v) are obtained with respect to the u-axis and the v-axis in a UV-plane. In this embodiment, an ordered pair of the second moments (U,V) corresponds to the characteristic value of the invention.

Figure 9A:
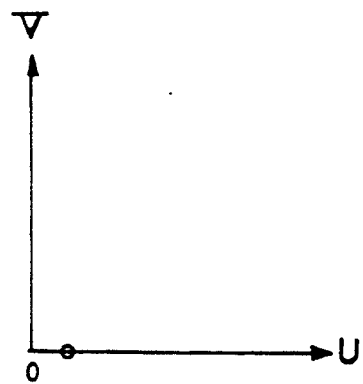
Figure 9B:
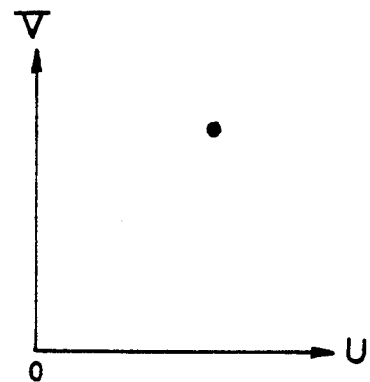

FIGS. 9A and 9B respectively show points plotted on a U-V space whose coordinates correspond to the second moments (U,V) of the spectrum distribution for a benign tumor (see FIG. 7A and 8A) and malignant tumor (see FIGS. 7B and 8B).

Because for the pattern of the benign tumor shown in FIG. 8A r has a slow variation with respect to $\theta$, the point corresponding to the ordered pair of the second moments (U,V) exists almost on the U-axis and near the origin 0. Because for the pattern of the malignant tumor shown in FIG. 8B r varies greatly with respect to $\theta$, the point corresponding to the ordered pair of the second moments (U,V) exists relatively far from the origin 0 in the U-V space.

After second moments (U,V) have been obtained in the characteristic calculating means 40f, information representing the second moments (U,V) is fed into a judging means 40g, wherein the probability that the subject shadow is the shadow of a malignant tumor is obtained from the information about the second moments (U,V), and thereafter the probability is compared with a predetermined threshold value in order to judge whether the subject shadow is the shadow of a malignant tumor or the shadow of a benign tumor.

Figure 10:
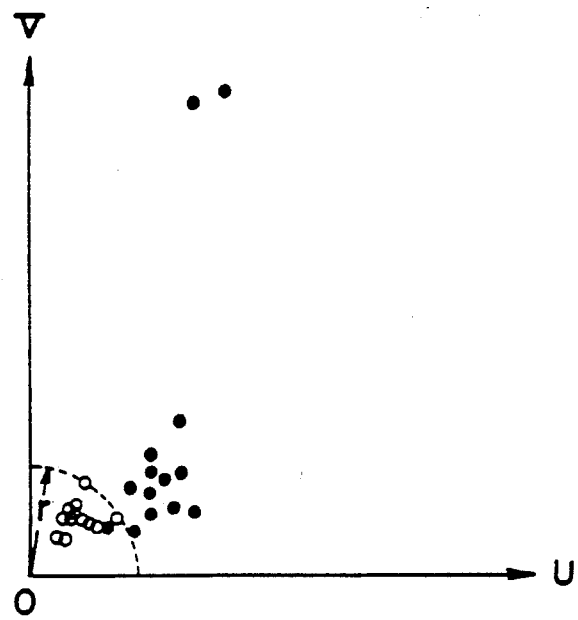
FIG. 10 shows the second moments plotted on the U-V space of the spectrum distributions of the image signals of 14 malignant tumors and 15 benign tumors which appeared in mammogram.

Reference is made to FIG. 10 showing second moments plotted on the U-V space. These moments were obtained experimentally from 14 different malignant tumors and 15 different benign tumors with the operation described above. Marks ○ and ○ represent the points corresponding to the ordered pairs of the second moments (U,V) of the shadows of benign tumors and the shadows of malignant tumors, respectively.

As shown in FIG. 10, the location of points corresponding to the ordered pairs (U,V) for the shadows of the benign tumors are close to the origin 0, and the location of points corresponding to the ordered pairs (U,V) for the shadows of the malignant tumors are relatively far away from the origin 0.

Hereupon, a judgment is made as to whether the points (U,V) exist or do not exist in the inner domain encircled by a circular arc having a predetermined radius r. This procedure allows a correct judgment to be made as to whether the subject shadow is the shadow of a benign tumor or the shadow of a malignant tumor in most cases.

In this embodiment, a characteristic value $C_2$ is calculated from the values of the second moments by use of the equation:

$$C_2 = \sqrt{U^2 + V^2} \quad (7)$$

The characteristic value $C_2$ indices the distance between the point (U,V) and the origin 0. Therefore, the further the point (U,V) is from the origin 0, the larger the characteristic value $C_2$ will be.

Thereafter, in the judging means 40g, the characteristic value $C_2$, which was obtained in the manner described above, is compared with a predetermined threshold value $TH_2$, which is equal to the length of the radius r shown in FIG. 10. If $C_2 \geq Th_2$, the subject tumor is classified as a malignant tumor, and if $C_2 < Th_2$, the subject tumor is classified as a benign tumors. Calculating the characteristic value $C_2$ by use of equation (7) and comparing it with the threshold value $Th_2$ is equivalent to discriminating between malignant tumors and the benign tumors in accordance with the location of the points (U,V) shown in FIG. 10.

Information representing the locations of shadows on the X-ray image which have been determined to be malignant tumors is fed into a display means 40h, which corresponds to the CRT display unit 44, in company with the image signal S3, and a visible image wherein the shadows of malignant tumors are pointed out is reproduced so that it can be examined.

Figure 11:
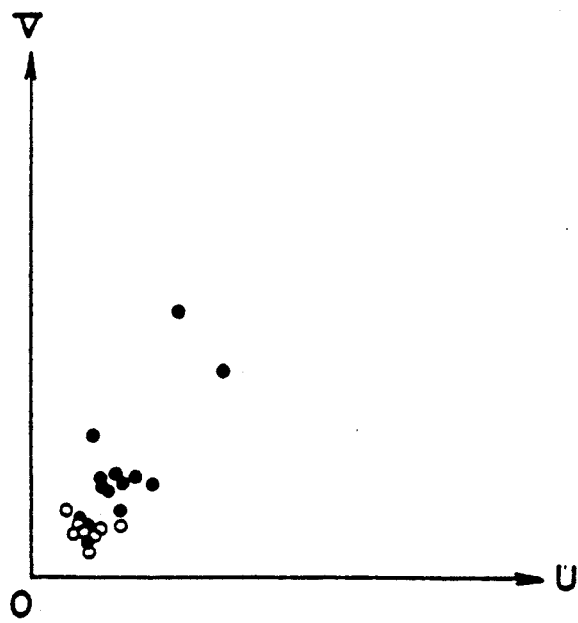
FIG. 11 shows second moments plotted on the U-V space for verifying the efficacy of the invention, the moments being plotted for the same tumors used in the calculation of the second moments shown in FIG. 10 but with no conversion of the coordinates of the image signal into polar form.

FIG. 11 shows points corresponding to ordered pairs of second moments (U,V) calculated for the same tumors used in the calculation of the second moments shown in FIG. 10 except that the coordinate conversion means 40d is bypassed. Similar to FIG. 10, marks ○ and ⓞ represent the location of points corresponding to ordered pairs of second moments (U,V) of the shadows of the benign tumors and the shadows of the malignant tumors, respectively.

The expression "the coordinate conversion means 40d is bypassed" means that the two-dimensional Fourier transformation is executed without any conversion of the coordinates of the image elements into polar form. Thereafter, similar to the manner described above, second moments are calculated and corresponding ordered pairs of them are plotted.

Calculating second moments without any conversion of the coordinates of the image signal elements into polar form is an application of the method disclosed, for example, in Japanese Unexamined Patent Publication No. 1(1989)-125675.

Hereupon, for verifying the efficacy of converting the coordinates of the image signal elements into polar form, in connection with exact of the cases shown in FIGS. 10 and 11, the distance between each point (U,V) and the origin 0 is calculated, the average and the variance of the distances are calculated, for each of the group of benign tumors and the group of malignant tumors, and a separation level D defined by the following equation $$D = \frac{(\sigma_1^2 + \sigma_2^2)/2}{(d_1^2 - d_2^2)} \quad (8)$$

is calculated, where $\bar{d}_1$ and $o_1^2$ represent respectively the average and the variance of the distance from the origin with respect to the group of benign tumors, and $\bar{d}_2$ and $o_2^2$ represent respectively the average and the variance of the distances from the origin with respect to the group of malignant tumors. Because of the definition represented by equation (8), it can be understood that the lower the value of the separation level D, the better the group of the benign tumors and the group of malignant tumors are separated with respect to each other.

For the conversion into polar coordinates as shown in FIG. 10, the value of the separation level D was $$D = 1.66 \quad (9)$$

for the case where the conversion into polar coordinates was not executed as shown in FIG. 11, the value of the separation level was $$D = 5.28 \quad (10)$$

From a comparison of equations (9) and (10), it can be seen that the conversion into polar coordinates contributes to the separation of the benign tumors and the malignant tumors. This is because the shadow of the malignant tumor extracted in this embodiment is a spicula, and the special features of the spicula can be extracted by a conversion into polar coordinates.

Although, in the above described embodiment, high and low frequency noise is reduced in the noise reduction means 40a and the trend reduction means 40b, these noise reducing operations need only be conducted when necessary; therefore, these noise reducing operations are not requisite to the invention. Also although in the above described embodiment, the shadows of the tumors are extracted by passing the image signal through a specific spatial filter in the shadow extraction means 40c, the filter for extracting the shadows of the tumors is not restricted to the filter described above. The shadow may also be extracted by visual means, for example, the visual image may first be displayed on the CRT display unit 44; then information representing the location of the shadow of a tumor may be input by an observer from the key board 43; thereafter, according to the invention, the judgment may be made as to whether the shadow designated in the manner described above is the shadow of a benign tumor or the shadow of a malignant tumor.

Further, in the above described embodiment the second moments (U,V) of the spectrum distribution F(U,V) are calculated in the characteristic calculating means 40f. Alternatively, the center of gravity (U',V') of the spectrum distribution may be calculated according to the following equations;

$$U' = \int_0^\infty u \cdot \left\{ \int_0^\infty F(u,v)dv \right\} du / \int_0^\infty \int_0^\infty F(u,v)dudv \quad (11)$$

$$V' = \int_0^\infty v \cdot \left\{ \int_0^\infty F(u,v)du \right\} dv / \int_0^\infty \int_0^\infty F(u,v)dudv \quad (12)$$

This center of gravity (U',V') may be used in place of said second moments (U,V). Moreover, other characteristic values obtained from various kinds of operations may be used in the invention.

Further, in the embodiment described above, the spectrum distribution F(u,v) is obtained by use of the two-dimensional Fourier transformation with respect to r and $\theta$. Alternatively, after the coordinates of the image signal S3 are expressed in polar form, and r and $\theta$ are then graphed in a rectangular coordinate system, one-dimensional spectrum distributions with respect to each line along the r-axis and each row along the $\theta$-axis may be obtained. In this case, the image signal is processed, for example, as follows.

From the characteristic values calculated for each spectrum distribution, such as the first moment (the center of gravity), the second moment, the sum of the spectra which is the total area under the curve graphed in the frequency-power space wherein the horizontal axis represents the frequency and the vertical axis represents the power (i.e. the sum of the power components corresponding to each frequency), the point (U″,V″) is obtained, where U″ and V″ are mean values of the characteristic values corresponding to the lines parallel to the r-axis and to rows parallel to the θ-axis, respectively, and the coordinate point (U″,V″) is used instead of the above mentioned coordinate points (U,V) or (U′,V′), whereby discrimination between the benign tumors and the malignant tumors can be made.

Still further, although, in the above described embodiments, a judgment is made as to whether the subject shadow is the shadow of a malignant tumor or the shadow of a benign tumor, the value of the characteristic value $C_2$, which is obtained before the judgment is made and which represents the probability that the shadow is the shadow of a malignant tumor, may be displayed together with the visible X-ray image. In this case, the judgment as to whether the tumor is benign or malignant is entrusted to an observer.

Still further, after obtaining said characteristic values, such as (U,V), or the like with respect to the subject shadows, or after automatically discriminating between benign tumors and malignant tumors, said characteristic values or the information representing the results of the discrimination may be stored in a memory unit in company with the image signal S3 instead of being reproduced immediately as a visible image.

In the embodiments described above, the shadows of tumors which may appear in a mammogram are extracted from X-ray images stored on a stimulable phosphor sheet. However, the object which is to be X-rayed is not restricted to mammas in the invention. The invention is also applicable to lung X-ray images, or the like. Further, the invention is not restricted to systems wherein stimulable phosphor sheets are used. The invention is widely applicable when the probability of the shadow of a tumor designated on a radiation image being the shadow of a malignant tumor is determined from the image signal representing a radiation image of an object.

We claim:

1. An apparatus for determining the probability that a shadow of a tumor designated on a radiation image of an object is the shadow of a malignant tumor on the basis of an image signal representing the radiation image, comprising:
   i) image reading means for reading said radiation image and for generating an analog signal representing said radiation image;
   ii) an A/D converter for converting said analog signal into a digital signal whereby said radiation image is represented by an electrical signal;
   iii) means for extracting a shadow portion from said electrical signal;
   iv) a spectrum calculating means for obtaining the spectrum distribution of the electrical signal $D(r,\theta)$ whose coordinates are expressed in polar form with the origin being assigned to the approximate center of said shadow portion and r and θ respectively representing the length of the radius vector and the angle the radius vector makes with a fixed line, said spectrum distribution being obtained with respect to r and θ;
   v) a characteristic value calculating means for obtaining a characteristic value representing said spectrum distribution on the basis of the spectrum distribution obtained by said spectrum calculating means; and
   vi) a judging means for determining the probability that said shadow portion of a tumor is the shadow of a malignant tumor on the basis of said characteristic value.

2. An apparatus as defined in claim 1 wherein said spectrum distribution is obtained from a one-dimensional Fourier transformation calculated with regard to r and θ.

3. An apparatus as defined in claim 1 wherein said spectrum distribution is obtained with the maximum entropy method calculated with respect to r and θ.

4. An apparatus as defined in claim 1 wherein said spectrum distribution is obtained from a two-dimensional Fourier transformation with respect to both r and θ.

5. An apparatus as defined in any one of claims 1 to 4, wherein said characteristic value is based on coordinates of the center of gravity of said spectrum distribution.

6. An apparatus as defined in any one of claims 1 to 4, wherein said characteristic value is based on the values of the coordinates of an ordered pair of second moments with respect to said spectrum distribution.

* * * * *